United States Patent [19]

Kimura

[11] Patent Number: 4,600,978
[45] Date of Patent: Jul. 15, 1986

[54] ILLUMINATOR
[75] Inventor: Shigeru Kimura, Kamakura, Japan
[73] Assignee: Nifco Inc., Yokohama, Japan
[21] Appl. No.: 674,808
[22] Filed: Nov. 26, 1984
[30] Foreign Application Priority Data
Nov. 25, 1983 [JP] Japan .............................. 58-181007[U]
[51] Int. Cl.⁴ .............................................. F21V 21/28
[52] U.S. Cl. .................................... 362/365; 362/269; 362/275
[58] Field of Search ............... 362/365, 269, 423, 427, 362/275
[56] References Cited
U.S. PATENT DOCUMENTS

| 1,468,727 | 9/1923 | Mullard | 362/365 |
| 1,888,734 | 11/1932 | McCabe | 362/365 |
| 2,198,077 | 4/1940 | Curtis | 362/269 |
| 2,362,110 | 11/1944 | Meyerhoefer | 362/365 |
| 2,401,390 | 6/1946 | Unger | 362/365 |
| 2,421,680 | 6/1947 | Candlin | 362/269 |
| 3,007,040 | 10/1961 | Schwartz | 362/269 |
| 4,511,954 | 4/1985 | Marcus | 362/365 |

Primary Examiner—Ronald B. Cox
Attorney, Agent, or Firm—Trexler, Bushnell & Wolters, Ltd.

[57] ABSTRACT

An illuminator of the type designed to be used as embedded in a framework is disclosed. A light push of the finger tip given to a lid on the front side of an illumination chamber causes the lid to open gently and, at the same time, puts on an electric bulb stowed in the illumination chamber, allowing it to illuminate the surrounding area.

6 Claims, 10 Drawing Figures

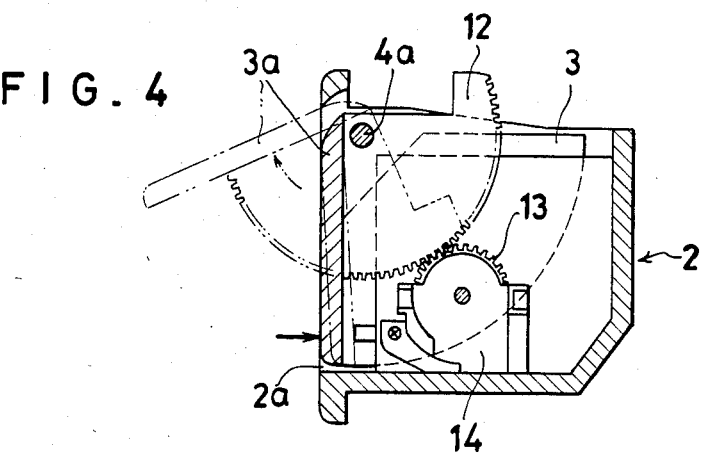
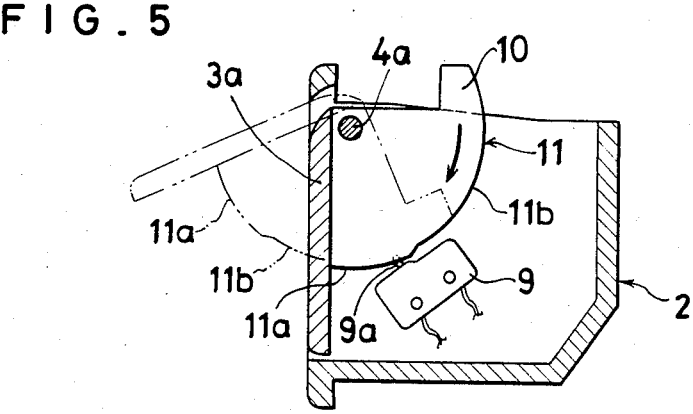
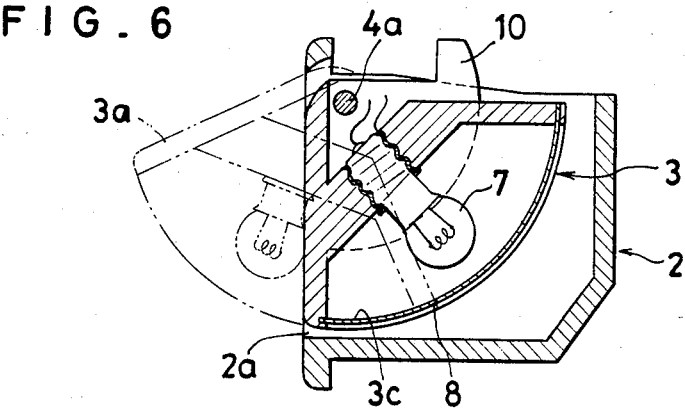

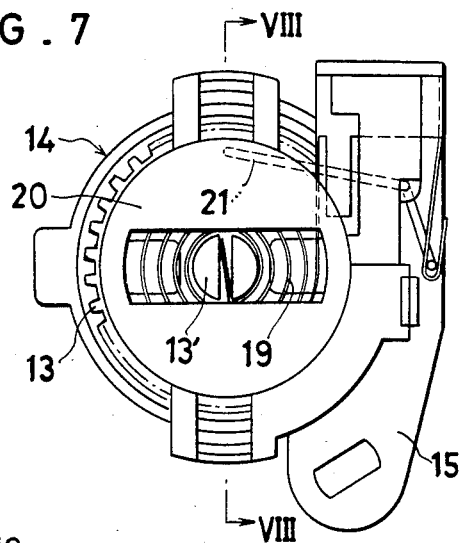
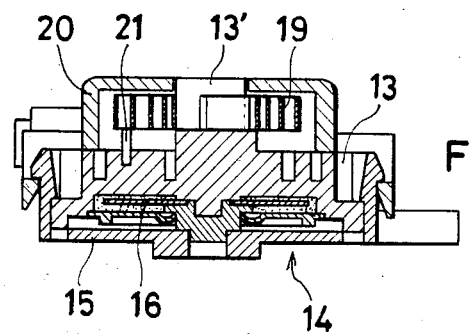
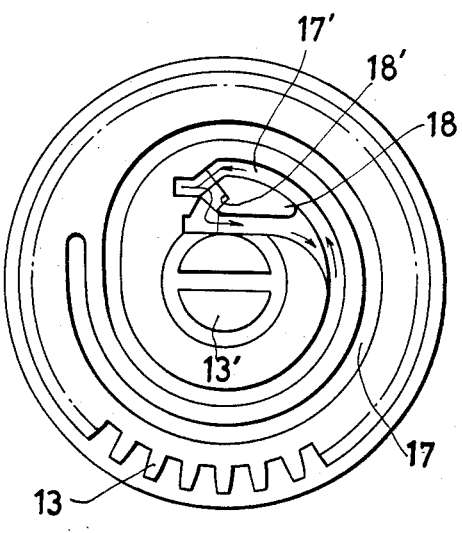

ILLUMINATOR

BACKGROUND OF THE INVENTION

1. Field of the Invention

This invention relates to an illuminator for partial illumination suitable for incorporation in a framework such as an automobile instrument panel or a bedroom wall.

2. Description of the Prior Art

The conventional illuminators of this type generally comprise an illuminating device and a switch therefor which is separated from the illuminating device. These illuminators are very troublesome to attach because the two components must be separately fixed in a plate and the provision of complicated wiring inside the illuminating device is required. Since the light-diffusing panel part of the illuminating device and the switch remain exposed to view even when the illuminator is not in use, they often impair the good appearance of the illuminator as a whole.

OBJECT OF THE INVENTION

An object of this invention is to provide an illuminator adapted to be embedded in a framework and kept concealed under a lid while not in use and, whenever needed, enabled by a touch to release the lid and turn on the light source stowed inside, allowing it to emit outside.

SUMMARY OF THE INVENTION

In the illuminator of this invention, an illumination chamber the front wall of which concurrently serves as a lid is pivotally attached to an outer case fitted in the framework, a rotary damper provided with a stopper is disposed between the outer case and the illumination chamber, and the lid, which is adapted to serve concurrently as the front wall of the illumination chamber while the illumination chamber is in its stowed state, substantially closes the open front side of the outer case and is allowed to retain that state by the stopper mechanism of the rotary damper until, on being slightly pushed into the outer case, it is gently opened aslant upwardly or downwardly while being braked by the rotary damper. During this motion of the lid, the light source stowed inside the illumination chamber is turned on and emits light outside.

In accordance with this invention, therefore, the installation of the illuminator is effected simply by fitting the outer case in its complete form in the framework, promising reduction of the time and labor required for the union of the illuminator with the framework. Since the front wall of the illumination chamber concurrently serves as the lid, the opening formed in the framework for admitting the outer case is not required to be closed. To open the illumination chamber from its closed state, a slight push given to the lid will automatically open the lid gently and smoothly aslant upwardly or downwardly and also automatically turn on the light source stowed inside the illumination chamber. Thus, this invention provides an illuminator that gives a strong impression of luxury.

The other objects and characteristic features of the present invention will become apparent to those skilled in the art as the disclosure is made in the following description of a preferred embodiment of the invention, as illustrated in the accompanying drawings.

BRIEF DESCRIPTION OF THE DRAWINGS

FIG. 4 is a cross sectional view taken along the line IV—IV of FIG. 3.

FIG. 5 is a cross sectional view taken along the line V—V of FIG. 3.

FIG. 6 is a cross sectional view taken along the line VI—VI of FIG. 3.

FIG. 7 is a front view illustrating a rotary damper provided with a stopper mechanism.

FIG. 8 is a cross sectional view taken along the line VIII—VIII of FIG. 7.

FIG. 9 is a top view of one typical toothed wheel of the rotary damper.

DESCRIPTION OF THE PREFERRED EMBODIMENT

Figure 1:
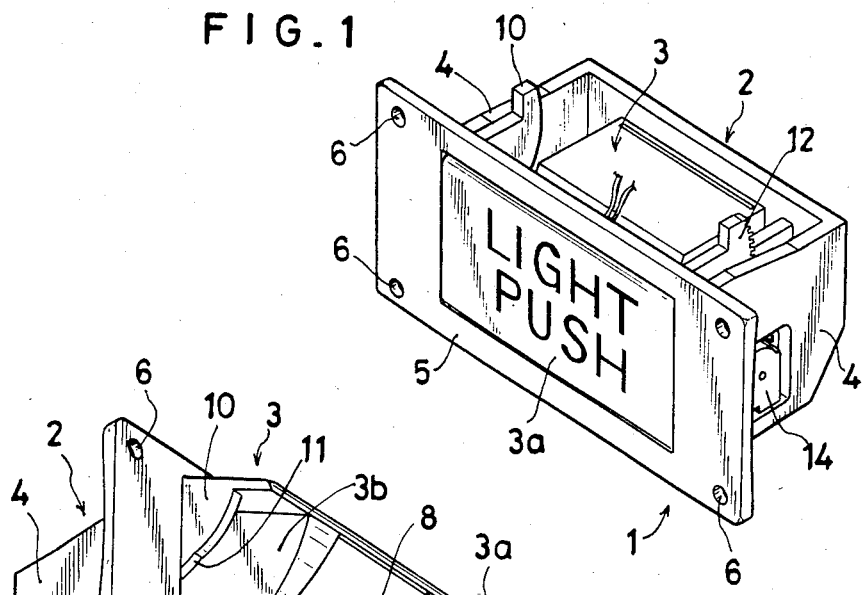
FIG. 1 is a perspective view illustrating an illuminator as one embodiment of this invention, with the illumination chamber in a closed state.
Figure 2:
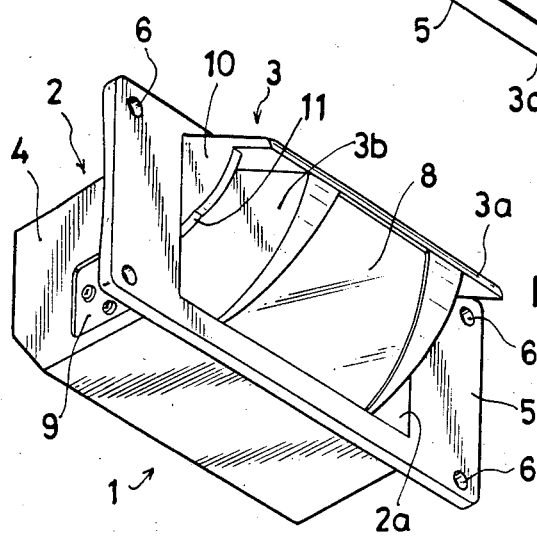
FIG. 2 is a perspective view of the illuminator of FIG. 1 in an opened state.
Figure 3:
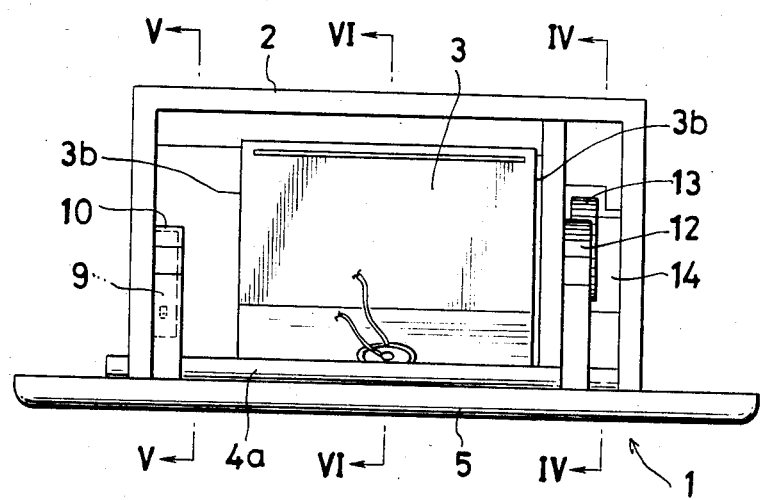
FIG. 3 is a top view of the illuminator of FIG. 1.

Referring to the drawings, 1 denotes a typical illuminator of the present invention. The illuminator 1 comprises an outer case 2 and an illumination chamber 3. The outer case 2 is in the shape of a box open on the front and upper sides. It is provided with a front panel 5 of the shape of a picture frame in front of opposite lateral walls 4. The front panel 5 is provided at the four corners thereof one each with fitting holes 6 for insertion of screws to be used for attaching the outer case 2 to the framework (not shown). Between the front edges of the opposite lateral walls 4, the illumination chamber 3 is pivotally attached with a shaft 4a.

The illumination chamber 3 is rotatably fastened with the shaft 4a to the opposite lateral walls 4. The front wall of the illumination chamber 3 serves concurrently as a lid 3a. When the illumination chamber 3 is in a closed state, the lid 3a is in a substantially upright position and closes an opening 2a of the outer case 2. In its opened state, the lid rises to a position slanted downwardly by about 60 degrees, with the lower half of the illumination chamber 3 thrust out of the opening 2a of the outer case 2. The lower side of the illumination chamber 3 has a semicircular cross section. The illumination chamber 3 is provided inside with a light source 7 and on the inner sides of opposite lateral pieces 3b with grooves 3c formed along the semicircular edges (FIG. 6). A light-diffusing member 8 of translucent plastic sheet, for example, is inserted along the grooves 3c. The light source 7 is connected to an external power source such as, for example an automobile battery via a switch 9, so that the operation of the switch 9 turns on the light source 7 which emits light through the light-diffusing member 8. Optionally, as the power source, a battery case may be directly fastened to the outer case 2 and a battery placed in the battery case may be connected to the light source 7 through the switch. In this case, since the power source is incorporated in the illuminator 1, the incorporation of the illuminator 1 in the framework can be effected without requiring any wiring. Thus, the work of installation can be simplified.

In the present embodiment, one of the fan-shaped lateral walls of the illumination chamber 3 serves concurrently as a cam plate 10 with the shaft 4a as the center. A switch 9 is fixed on the inner side of one of the lateral walls 4 of the outer case 2 corresponding to the aforementioned lateral wall of the illumination chamber 3. These two mutually corresponding lateral walls are so disposed that a cam face 11 of the cam plate 10 will slide on an operating projection 9a of the switch 9. The cam face 11 of the cam plate 10 possesses a first cam face 11a having a large amount of eccentricity and a second cam face 11b extending from the trailing end of the first cam face 11a and having a small amount of eccentricity both about the center of a shaft 4a extended from the rear side of the lid 3a. The switch 9 is of the normally closed type. It, therefore, assumes the OFF status when the operating projection 9a comes into engagement with the first cam face 11a and the ON status when the operating projection 9a comes into engagement with the second cam face 11b (FIG. 5).

In the present embodiment, the other fan-shaped lateral wall of the illumination chamber 3 is provided on the arcuate surface thereof with a sector gear 12 with the shaft 4a as the center. On the inner side of the other lateral wall 4 of the outer case corresponding to the other lateral wall of the illumination chamber 3, there is fixed a rotary damper 14 provided with a stopper mechanism incorporating therein a toothed wheel 13 adapted to be meshed with the teeth of the sector gear 12 (FIG. 4).

Figure 10:
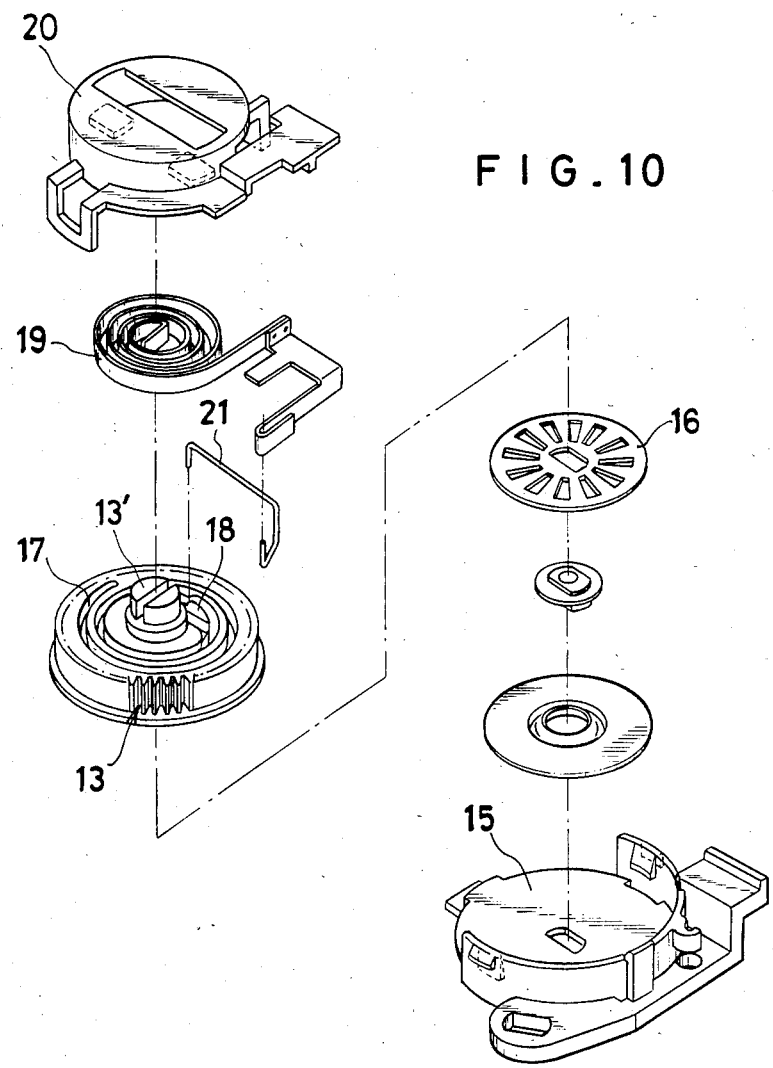
FIG. 10 is an exploded perspective view of the rotary damper of FIG. 7.

One embodiment of the rotary damper is illustrated in FIGS. 7-10. The rotary damper is not limited to the illustrated embodiment. Any modification is allowable in so far as it fulfills the same function. To be specific, the toothed wheel 13 is only required to be so adapted that, during the rotation in the normal and reverse direction, the toothed wheel 13 in motion is braked by the viscous resistance offered by silicone oil, for example, and while the toothed wheel 13 is being rotated in either of the normal and reverse directions, the toothed wheel 13 keeps winding a spring such as, for example, a coil spring and causes the spring to accumulate resilient force and, during the last stage of the rotation in that direction, the toothed wheel 13 is prevented by a locking mechanism making use of a heart cam from reversing its rotation and, after the toothed wheel is finally locked and prevented from the reverse rotation by the locking mechanism, a slight turn given thereto releases the toothed wheel 13 from the locking mechanism and allows it to be rotated, though in a braked condition, in the reverse direction by virtue of the accumulated resilient force of the spring.

Now, referring to FIGS. 7-10, the toothed wheel is set in place so as to be rotated on a fitting base plate 15. In the depressed lower side of the toothed wheel 13 is fitted a braking panel 16 which is fixed on the fitting base plate 15. The silicone grease is applied on the lower side of the toothed wheel 13 and the opposed surface of the braking panel 16 used effectively for braking the rotation of the toothed wheel 13 in its normal and reverse directions.

The toothed wheel 13 is provided on the upper side thereof with a spiral groove 17. This spiral groove 17 is provided at the inner end thereof with a one-way passage 17' completely encircling a heart island 18. The toothed wheel is further provided at the center on the upper side thereof with a boss 13' for fastening the inner end of a spring 19. On the upper side of the toothed wheel 13, an upper lid 20 joined with the fitting base plate 15 is mounted in place. Part of the peripheral edge of the toothed wheel 13 protrudes out of the upper lid 20 and comes into engagement with the aforementioned sector gear 12. To the upper lid 20 is attached a resilient stop pin 21 having the leading end thereof bent downwardly and thrust into the spiral groove 17. The spring 19 has the outer end part thereof fixed to the upper lid 20. It is accommodated within the upper lid above the stop pin 21. It is fastened to the inner side of the lateral wall of the outer case 2 through the medium of the fitting base plate 15.

As described above, the outer case 2 incorporates therein the illumination chamber 3 containing the light source 7, the switch 9 for operating the light source 7, and the rotary damper 14 provided with the stopper mechanism and the front wall of the illumination chamber 3 serves concurrently as the lid 3a for closing the opening 2a of the outer case 2. The framework (such as the instrument panel in an automobile; not shown) is only required to have formed in advance therein an opening for snugly admitting the rear part of the outer case 2. After the light source 7 has been connected to an external power source such as the automobile battery (not shown) via the switch 9, the rear part of the outer case 2 is inserted through the aforementioned opening and then the outer case 2 is fastened to the framework simply by driving screws in the fitting holes 6 of the front panel 5.

By giving a slight push with the finger tip to the lid 3a in its closed state, the illumination chamber 3 is raised by the rotary damper 14 to a position slanted downwardly and the lower half of the illumination chamber 3 is protruded out of the front side of the outer case 2 and, at the same time, the switch 9 is turned ON to turn on the light source 7 and emit light through the light-diffusing member 8 in the lower side of the illumination chamber 3.

During this process, the rotary damper 14 functions to open the illumination chamber 3 through the sector gear 12 because the stop pin 21 is released from the recess 18' of the heart island 18 and, as a result, the toothed wheel 13 is slowly rotated in the reverse direction by the resilient force of the spring 19 while under continued exertion of braking force of the silicone grease.

When the illumination chamber 3 is rotated, the cam plate 10 is rotated in conjunction therewith. Consequently, the operating projection 9a of the switch 9 shifts its engagement from the first cam face 11a to the second cam face 11b of a smaller amount of eccentricity to turn ON the switch 9 and energize the light source 7. The light from the illuminator permits the occupant of the automobile to read a map or search for a misplaced article.

In the present embodiment, the light from the illuminator does not leak from the front side and the opposite lateral sides because the light-diffusing member 8 is disposed in the lower side of the illumination chamber 3 and the lid 3a and the opposite lateral plates 3b of the illumination chamber 3 are made of opaque materials. The illumination effected in this manner proves advantageous from the standpoint of safe automobile operation because the light from the illuminator does not interfere with the operator's vision.

To close the illumination chamber 3 from its opened state, the user is only required to push the lid 3a slightly past the regular closing position and let go. As a result, the illumination chamber is locked at the position inside the outer case 2 by the stopper mechanism of the rotary damper 14 and the opening of the outer case 2 is closed with the lid 3a of the illumination chamber 3 and, at the same time, the switch 9 is turned OFF to put out the light source 7.

During this process, the rotary damper 14 functions so that the toothed wheel 13 kept in mesh with the sector gear 12 is rotated in one direction (with the rotation braked by the silicone grease applied on the braking panel 16 and on the lower side of the toothed wheel 13) to wind the coil spring 19 from the inner side and the stop pin 12 follows its way along the spiral groove 17 and, when the lid 3a nears the position of complete closure, moves in the one-way path 17' around the heart island. After the lid 3a has been moved slightly past the position of closure and released, the coil spring 19 by virtue of the accumulated resilient force imparts a slight rotation in the reverse direction to the toothed wheel 13 and brings the lid 3a exactly to the position of closure. At this moment, the leading end of the stop pin 21 is caught fast in the recess 18' of the heart island 18 to keep the toothed wheel 13 from further rotation and retain it there fast. When the illumination chamber 3 is rotated in the reverse direction, the cam plate 10 is rotated in conjunction therewith. Consequently, the operating projection 9a of the switch shifts its engagement from the second cam face 11b to the first cam face 11a of a larger amount of eccentricity to turn OFF the switch and put out the light source 7.

For replacement of the light source 7 inside the illumination chamber 3, the user is only required to keep the illumination chamber 3 in its opened state and pull the light-diffusing member toward himself. Consequently, the light-diffusing member 8 is moved along the grooves 3c on the inner sides of the opposite lateral plates 3b to open the lower side. Thus, the user is allowed to insert his hand through the opening, unscrew the burned-out bulb from the socket inside, and replace it with a new bulb. After this replacement, the light-diffusing member 8 is slid in toward the recess of the framework until it is inserted in the grooves 3c. When the light-diffusing member 8 is broken or when the color or illuminance of the light is desired to be changed, the old light-diffusing member is slid out of the grooves 3c and a new light-diffusing member 3c is inserted into the grooves 3c.

In summary, in accordance with this invention, the illuminator has no need for a coil spring or other similar means otherwise set on the shaft for urging the opening motion of the lid and can be joined with the framework with simplicity. When the illumination chamber is set in place inside the outer case, the front wall of the illumination chamber serves concurrently as the lid for closing the front side of the framework. For installation of this illuminator in a framework such as the instrument panel in an automobile, the framework should have an opening for snugly admitting the outer case of the illuminator. Then, the installation is effected simply by inserting the outer case into the framework through this opening and fastening the illuminator to the framework with screws, for example.

Further, since the switch is incorporated in the outer case, the framework is not required to be provided with any extra space for the fixation of the switch. The position of installation of the illuminator is not critical and there is no need for troublesome wiring. Thus, the installation of the illuminator is notably simplified.

A slight push of the finger tip given to the lid in the closed position causes the lid to open slowly to a position slanted downwardly to expose the lower half of the illumination chamber out of the front side of the outer case and energize the light source. Then, a push given to the lid which is opened in the position slanted downwardly puts out the light source. The opening and closing of the illumination chamber, therefore, can be effected with great smoothness. Moreover, the light source is automatically put on and put out by the opening and closing motion of the lid, it can be operated without requiring manipulation of a switch.

In the embodiment, the illumination chamber is designed to be opened as slanted downwardly. Depending on the position selected for attachment of the illuminator, the illumination chamber may be adapted to be opened as slanted upwardly or sideways.

What is claimed is:

1. An illuminator, comprising in combination: an outer case provided with opposite lateral walls, opened on the front side, and provided with means capable of attaching said outer case to a framework, an illumination chamber having opposite lateral walls and pivotally disposed between said lateral walls of said outer case so as to be rotated between a closed position and an opened position relative to said outer case and provided with a lid adapted to close the opened front side of said outer case when in the closed position, a light source disposed inside said illumination chamber, a rotary damper provided with stopper means capable of retaining said illumination chamber normally in the closed position relative to said outer case and provided with means for driving said illumination chamber to its open position in response to release of said stopper means, and switch means including a switch member fixed to said outer case and switch actuating means on said illumination chamber adapted to put on said light source when said illumination chamber is rotated to the opened position thereof.

2. An illuminator according to claim 1, wherein said switch actuating means comprises a cam formed on one of the opposite lateral walls of said illumination chamber, said switch member having an operating projection thereof disposed so as to be in sliding contact with said cam at all times.

3. An illuminator according to claim 1, wherein said rotary damper comprises a rotary toothed wheel and means mounting said rotary toothed wheel to an surface of said outer case, and wherein the other of said lateral walls of said illumination chamber is provided with an arcuate sector gear for intermeshing with said toothed wheel.

4. An illuminator according to claim 3 wherein said rotary damper further comprises a housing rotatably mounting said toothed wheel, a braking member mounted in said housing and coupled for rotation in unison with said toothed wheel, and a quantity of viscous fluid in said housing for damping rotation of said braking member.

5. An illuminator according to claim 4 wherein said rotary damper further includes a spring element coupled with said rotary toothed wheel to be tensioned in response to rotation of the wheel in a first direction corresponding to closing of said illumination chamber so as to propel said illumination chamber to the open position thereof when said stopper means is released.

6. An illuminator according to claim 5 wherein said stopper means comprises a spring-like stop pin and a cooperating heart cam, said heart cam being coupled for movement in unison with said rotary toothed wheel and responsive to initial reverse rotation of said toothed wheel in response to slight further movement of said illumination chamber when closed in the direction of closing thereof for releasing said stop pin from engagement therewith.

* * * * *